(12) United States Patent
Kumakura

(10) Patent No.: US 9,225,992 B2
(45) Date of Patent: Dec. 29, 2015

(54) IMAGE ENCODING APPARATUS, IMAGE ENCODING METHOD, IMAGE ENCODING PROGRAM, IMAGE DECODING APPARATUS, IMAGE DECODING METHOD, AND IMAGE DECODING PROGRAM

(71) Applicant: JVC KENWOOD Corporation, Yokohama (JP)

(72) Inventor: Toru Kumakura, Yokohama (JP)

(73) Assignee: JVC KENWOOD Corporation, Yokohama-shi (JP)

( * ) Notice: Subject to any disclaimer, the term of this patent is extended or adjusted under 35 U.S.C. 154(b) by 632 days.

(21) Appl. No.: 13/630,937

(22) Filed: Sep. 28, 2012

(65) Prior Publication Data
US 2013/0022110 A1    Jan. 24, 2013

Related U.S. Application Data

(63) Continuation of application No. PCT/JP2011/001689, filed on Mar. 23, 2011.

(30) Foreign Application Priority Data

Mar. 31, 2010  (JP) .................................. 2010-082689
Mar. 31, 2010  (JP) .................................. 2010-082690

(51) Int. Cl.
 *H04N 7/12*     (2006.01)
 *G06K 9/36*     (2006.01)
 (Continued)

(52) U.S. Cl.
 CPC ........... *H04N 19/463* (2014.11); *H04N 19/105* (2014.11); *H04N 19/11* (2014.11); *H04N 19/176* (2014.11); *H04N 19/593* (2014.11); *H04N 19/61* (2014.11)

(58) Field of Classification Search
 CPC ... H04N 19/463; H04N 19/70; H04N 19/503; H04N 19/433
 USPC ........................................ 375/240.12–240.26
 See application file for complete search history.

(56) References Cited

U.S. PATENT DOCUMENTS 8,837,582 B2 *  9/2014  He et al. .................... 375/240.03
2008/0219578 A1 *  9/2008  Lee ................................ 382/247
(Continued)

FOREIGN PATENT DOCUMENTS

JP    10-210474 A    8/1998
JP    2006-310941 A  11/2006
JP    2008-147998 A   6/2008
JP    2009-284275 A  12/2009

OTHER PUBLICATIONS

Haruhisa Kato et al., "A Study of Inter-channel Prediction for Intra Prediction Error in H.264," 2009 Nen Picture Coding Symposium of Japan Dai 24 Kai Symposium Shiryo, The Institute of Electronics, Information and Communication Engineers, Oct. 7, 2009, pp. 61-62.

*Primary Examiner* — Dave Czekaj
*Assistant Examiner* — Tsion B Owens
(74) *Attorney, Agent, or Firm* — Venable LLP; Michael A. Sartori; Todd R. Farnsworth

(57) ABSTRACT

An intra-prediction unit generates an intra-prediction signal of an image. A subtraction unit calculates a first residual signal from a difference between an original signal of the image and the intra-prediction signal. A residual approximation signal creation unit creates a residual approximation signal by linearly approximating the first residual signal based on a DC component of the first residual signal. A subtraction unit calculates a second residual signal from a difference between the first residual signal and the residual approximation signal. An orthogonal transformation coefficient integration unit generates a third residual signal by synthesizing the DC component of the first residual signal and the second residual signal. A variable-length encoding unit performs variable-length encoding of the third residual signal.

13 Claims, 8 Drawing Sheets

(51) Int. Cl.
*H04N 19/463* (2014.01)
*H04N 19/105* (2014.01)
*H04N 19/176* (2014.01)
*H04N 19/61* (2014.01)
*H04N 19/593* (2014.01)
*H04N 19/11* (2014.01)

(56) References Cited

U.S. PATENT DOCUMENTS

2009/0238279 A1\* 9/2009 Tu et al. .................... 375/240.16
2012/0093426 A1\* 4/2012 Sato .............................. 382/233
2012/0195379 A1\* 8/2012 Alshin et al. ............. 375/240.12

\* cited by examiner

4 × 4 SUBBLOCK INTRA-PREDICTION MODE

IMAGE ENCODING APPARATUS, IMAGE ENCODING METHOD, IMAGE ENCODING PROGRAM, IMAGE DECODING APPARATUS, IMAGE DECODING METHOD, AND IMAGE DECODING PROGRAM

CROSS REFERENCE TO RELATED APPLICATION

This patent application claims priority based on a PCT application, PCT/JP2011/001689 filed on 23 Mar. 2011, the contents of which are incorporated herein by reference.

BACKGROUND OF THE INVENTION

1. Field of the Invention

The present invention relates to an image encoding/decoding technology including an intra-prediction.

2. Description of the Related Art

In MPEG-4 AVC/H.264 (hereinafter, referred to as "AVC"), improvement of encoding efficiency in a frame has been enhanced by employing an intra-prediction wherein a processed pixel in the same frame is referenced. In AVC, after an encoding target frame is divided into a macroblock (16×16 pixel unit), the macroblock is further divided into a subblock such as an 8×8 pixel unit or a 4×4 pixel unit, and is processed.

FIG. 1 is a diagram showing a processing order of encoding of a macroblock. A reference sign 101 denotes the processing order of the macroblock, a reference sign 102 denotes the processing order of a 4×4 subblock, and a reference sign 103 denotes the processing order of an 8×8 subblock, the respective processing orders being shown by the arrows. Intra-prediction processing is, at each time, performed using decoded pixels of a subblock positioned at an upper side and a left side, the processing of which has been already completed.

FIG. 2 is a diagram illustrating intra-prediction processing. In an intra-prediction of the 4×4 subblock, 9 modes denoted by a reference sign 201 in FIG. 2 are defined in advance, and one of the 9 modes is selected with respect to each subblock. One of the 9 modes is a DC mode. A prediction signal uses a uniform value with respect to a prediction direction shown by the arrow.

An example of the prediction signal is shown by a reference sign 202 in FIG. 2. Reference signs 203 to 206 denote decoded subblocks, and a reference sign 207 denotes a target subblock to be processed. When a horizontal direction mode is selected as a prediction mode of the reference sign 207, the prediction signals (a to p) are a=b=c=d=I, e=f=g=h=J, i=j=k=l=K, m=n=o=p=L, and when a vertical direction mode is selected, the prediction signals (a to p) are a=e=i=m=A, b=f=j=n=B, c=g=k=o=C, and d=h=l=p=D.

Japanese Patent Application Laid-Open No. 2009-284275 discloses a technology that improves prediction accuracy by taking an arbitrary prediction direction.

CITATION LIST

Patent Literature

Patent Literature 1: Japanese Patent Application Laid-Open No. 2009-284275

Since, in the intra-prediction of AVC, the prediction direction is restricted to 8 directions shown in FIG. 2, the prediction accuracy is not sufficient. Also, since the same prediction value is used in a single direction, even if an appropriate mode is selected, change of a pixel value along the prediction direction cannot be attained, and this hinders improvement of the prediction efficiency.

While the method disclosed in Japanese Patent Application Laid-Open No. 2009-284275 improves the prediction efficiency and decreases a prediction residue, the method is accompanied by an increase of an encoding bit amount due to transmission of prediction direction information of each block. Therefore, the method may not necessarily lead to the improvement of the encoding efficiency. Further, since the method disclosed in Japanese Patent Application Laid-Open No. 2009-284275 applies the same value to the same prediction direction, the change of the pixel value along the prediction direction cannot be attained.

SUMMARY OF THE INVENTION

The present invention has been made in view of the foregoing, and an object of the present invention is to provide an image encoding apparatus and an image encoding method that are capable of improving encoding efficiency in an intra-prediction. Further, another object is to provide an image decoding apparatus and an image decoding method that support an image encoding technology capable of improving the encoding efficiency in an intra-prediction.

To solve the above-described problems, an image encoding apparatus according to an aspect of the present invention includes: an intra-prediction unit configured to generate an intra-prediction signal of an image; a first subtraction unit configured to calculate a first residual signal from a difference between an original signal of the image and the intra-prediction signal; a residual approximation signal creation unit configured to create a residual approximation signal by linearly approximating the first residual signal based on a DC component of the first residual signal; a second subtraction unit configured to calculate a second residual signal from a difference between the first residual signal and the residual approximation signal; an integration unit configured to generate a third residual signal by synthesizing the DC component of the first residual signal and the second residual signal; and a variable-length encoding unit configured to perform variable-length encoding of the third residual signal.

Another aspect of the present invention provides an image encoding method. This method includes the steps of: acquiring a first error value of each sample point by obtaining, with respect to a plurality of sample points of an image, a difference between a pixel value of each sample point and a first prediction value of the each sample point; acquiring a second error value of each sample point by obtaining a difference between the first error value of each sample point and a second prediction value of the each sample point, the second prediction value being a linear approximation coefficient obtained based on an average value of the first error value of each sample point; and encoding the average value of the first error value of each sample point and the second error value together.

An image decoding apparatus according to still another aspect of the present invention includes: a variable-length decoding unit configured to perform variable-length decoding of an encoded stream of an image; a transformation coefficient separation unit configured to separate a DC component and an AC component of a transformation coefficient subjected to the variable-length decoding; a DC component inverse-transformation unit configured to calculate a decoded DC component by performing inverse-transformation of the DC component of the transformation coefficient; a residual approximation signal creation unit configured to create a residual approximation signal based on the decoded DC component; an inverse-transformation unit configured to calculate a decoded residual component by performing inverse-transformation of the AC component of the transformation coefficient; and an adding unit configured to create a decoded signal by adding the residual approximation signal and the decoded residual component to an intra-prediction signal generated by performing intra-prediction processing of a reference image signal.

Another aspect of the present invention provides an image decoding method. This method includes the steps of: decoding, with respect to a plurality of sample points of an original signal of an image, a first prediction value of each sample point, and a difference value between a value of the original signal of each sample point and a second prediction value; separating the difference value into a DC component and an AC component; obtaining a linear approximation coefficient obtained based on the DC component of the difference value of each sample point as the second prediction value; and creating a decoded signal by adding the first prediction value, the second prediction value, and the AC component of the difference value.

Note that a method, an apparatus, a system, a recording medium, a computer program or the like, into which any combinations of the above elements and the expression of the present invention are incorporated, is also effective as the aspect of the present invention.

DETAILED DESCRIPTION OF THE INVENTION

The invention will now be described by reference to the preferred embodiments. This does not intend to limit the scope of the present invention, but to exemplify the invention.

First, a concept of a conventional intra-prediction will be described with reference to FIG. 4, and next, a principle of an intra-prediction according to an embodiment of the present invention will be described with reference to FIG. 5.

Figure 4:
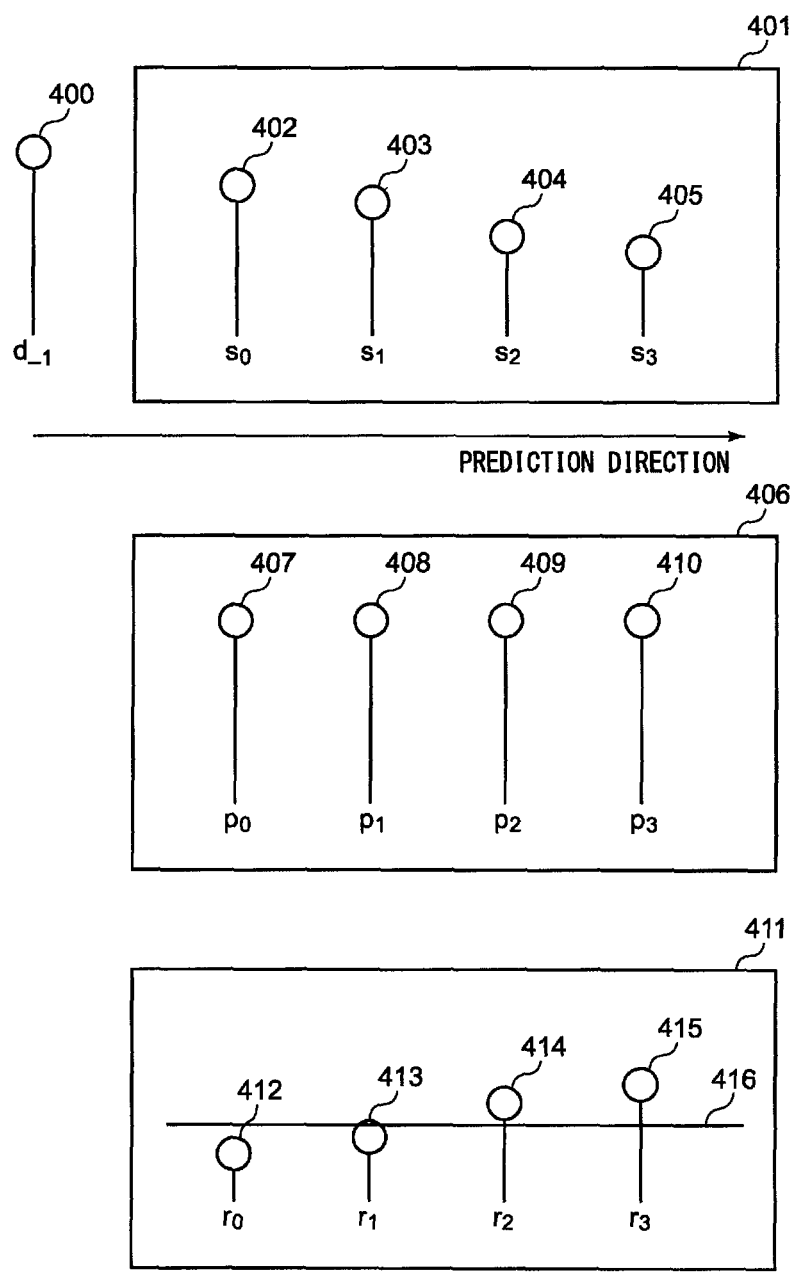
FIG. 4 is a conceptual diagram showing a residual component creation process according to a conventional intra-prediction.

FIG. 4 is a conceptual diagram showing a residual component creation process according to a conventional intra-prediction. In FIG. 4, a reference sign 400 denotes an encoded reference signal, a reference sign 401 denotes an original signal of an encoding target, a reference sign 406 denotes an intra-prediction signal, and a reference sign 411 denotes a residual signal. Here, for simplicity, an image signal will be described in one dimensional signal taking a signal value on a vertical axis.

Reference signals 402, 403, 404, and 405 in the original signal 401 respectively denote the signal values $s_0$, $s_1$, $s_2$, and $s_3$ in height at positions 0, 1, 2, and 3 of the original signal. The reference signal 400 denotes the signal value $d_{-1}$ of the reference signal 400 in height.

Reference signs 407, 408, 409, and 410 in the intra-prediction signal 406 denote the signal values $p_0$, $p_1$, $p_2$, and $p_3$ of the prediction signal in height using the reference signal 400 at the positions 0, 1, 2, and 3 that are the same position as the original signal, and each of the signal values takes the same value as the signal value $d_{-1}$ of the reference signal 400.

The signal values $r_0$, $r_1$, $r_2$, and $r_3$ denoted by reference signs 412, 413, 414, and 415 of the residual signal 411 can be obtained by respectively subtracting the signal values $p_0$, $p_1$, $p_2$, and $p_3$ of the prediction signals 407, 408, 409, and 410 from the signal values $s_0$, $s_1$, $s_2$, and $s_3$ of the original signals 402, 403, 404, and 405. A level denoted by a reference sign 416 is a DC value of the residual signals 412, 413, 414, and 415.

When the prediction accuracy is low, especially, a prediction of a low region component is low, an absolute value of the DC value denoted by the reference sign 416 increases. The embodiment of the present invention realizes the improvement of the encoding efficiency by creating an approximation signal of the residual signal with the DC value of the residual signal, and reducing information amount of the residual signal.

Figure 5:
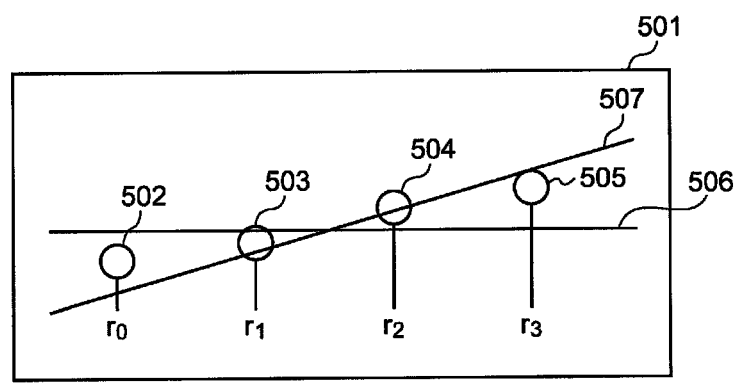
FIG. 5 is a conceptual diagram showing an approximation signal creation process according to the embodiment of the present invention.
Figure 5:
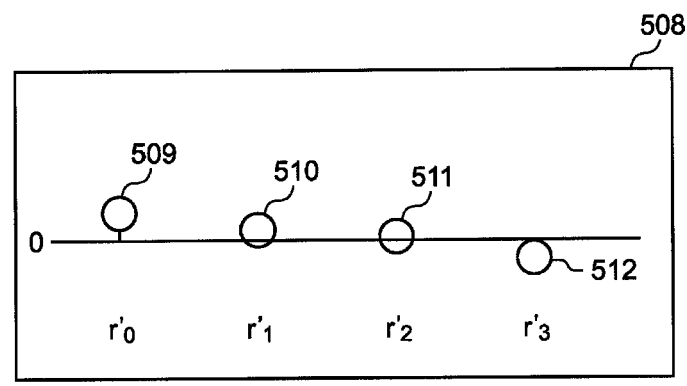

FIG. 5 is a conceptual diagram showing an approximation signal creation process according to the embodiment of the present invention. A reference sign 501 in FIG. 5 denotes a residual signal of an intra-prediction, and a reference sign 508 denotes a final residual signal obtained by subtracting an approximation signal.

Reference signs 502, 503, 504, and 505 in the residual signal 501 denote the signal values $r_0$, $r_1$, $r_2$, and $r_3$ of the residual signal at the positions 0, 1, 2, and 3 that are the same position as the original signal, and the respective residual signals are the same as the residual signals 412, 413, 414, and 415 in FIG. 4. A level denoted by a reference sign 506 is a DC value of the residual signals 502, 503, 504, and 505, and is the same as the level denoted by the reference sign 416 in FIG. 4.

A straight line is obtained, which passes through a point (1.5, q) and linearly approximates sample points (0, $r_0$), (0, $r_1$), (0, $r_2$), and (0, $r_3$) of the residual signal where the DC value 506 at a middle point position 1.5 between the position 0 of the residual signal 502 and the position 3 of the residual signal 505 is q. For example, the linear approximation straight line is obtained by a least squares method. Alternatively, a straight line that passes through a point (−1, 0) and a point (1.5, q) where the signal value is 0 at the position −1 of the reference signal 400 may also be acceptable as the linear approximation straight line. The linear approximation straight line obtained in this way is denoted by a reference sign 507.

The final residual signal 508 is calculated by respectively subtracting values shown by the linear approximation straight line 507 from the signal values $r_0$, $r_1$, $r_2$, and $r_3$ of the residual signals 502, 503, 504, and 505. Reference signs 509, 510, 511, and 512 in the final residual signal 508 denote the signal values $r'_0$, $r'_1$, $r'_2$, and $r'_3$ of the final residual signal in height at the positions 0, 1, 2, and 3 that are the same position as the original signal. The encoding information amount of the final residual signals 509, 510, 511, and 512 can be expected to be smaller than that of the residual signals 502, 503, 504, and 505 before approximation.

In FIGS. 4 and 5, description has been made using one dimensional signal. However, in the case of using a two dimensional image signal, the approximation straight line of the prediction residual signal is replaced by an approximation plane.

As described above, typically, when a plurality of sample points of a moving image is given, a first error value of each sample point is acquired by obtaining a difference between a pixel value of each sample point and a first prediction value of the sample point. Next, a linear approximation coefficient obtained based on a total or an average value of the first error value of each sample point is considered to be a second prediction value of each sample point. Further, a new error value (second error value) of each sample point is acquired by obtaining a difference between the first error value of each sample point and the second prediction value of the sample point. A prediction error of the sample point can be encoded in an efficient manner by integrating and encoding the average value of the first error value of each sample point and the second error value obtained in this way.

At decoding, with respect to a plurality of sample points in the original signal of an image, the first prediction value of each sample point, and the difference value between the original signal of each sample point and the second prediction value are decoded. The difference value is divided into a direct-current (DC) component (corresponding to a total or an average value of the error value of the sample point) and an alternating-current (AC) component (corresponding to the final residual component). Next, a linear approximation coefficient obtained based on the DC component of the difference value of each sample point is obtained as the second prediction value of each sample point. A decoded signal can be obtained by adding the first prediction value, the second prediction value, and the AC component of the difference value obtained in this way.

One cause for occurrence of a large residue in an intra-prediction is that a change of a signal along a prediction direction has not been sufficiently captured. At that time, even if the prediction direction is not wrong, the DC component occurs along with the AC component. Therefore, the embodiment of the present invention aims to reduce information amount of the residual signal by predicting its own AC component from the DC component of the residual signal of the intra-prediction.

Specifically, a final residual component is obtained in such a way that a linear signal having the same DC value as the prediction residual signal is assumed to be a residual approximation signal, and the linear signal is subtracted from the prediction residual signal. Since the final residual component has only the AC component, the final residual component is encoded by embedding the DC component of the prediction residue that has been calculated in advance into the position of the DC component, and is transferred.

In the case where the above-described approximation method of a residual signal is applied to all blocks, no additional information is required for encoding data because the prediction signal can be created from a decoded DC value of the intra-prediction. In the case where a configuration that switches enabling/disabling of the approximation function of the residual signal in a unit of block is employed, the configuration can be realized by adding only a switching flag of one bit in a unit of block.

Hereinafter, encoding of one block in an image encoding apparatus according to an embodiment of the present invention will be exemplarily described.

Figure 3:
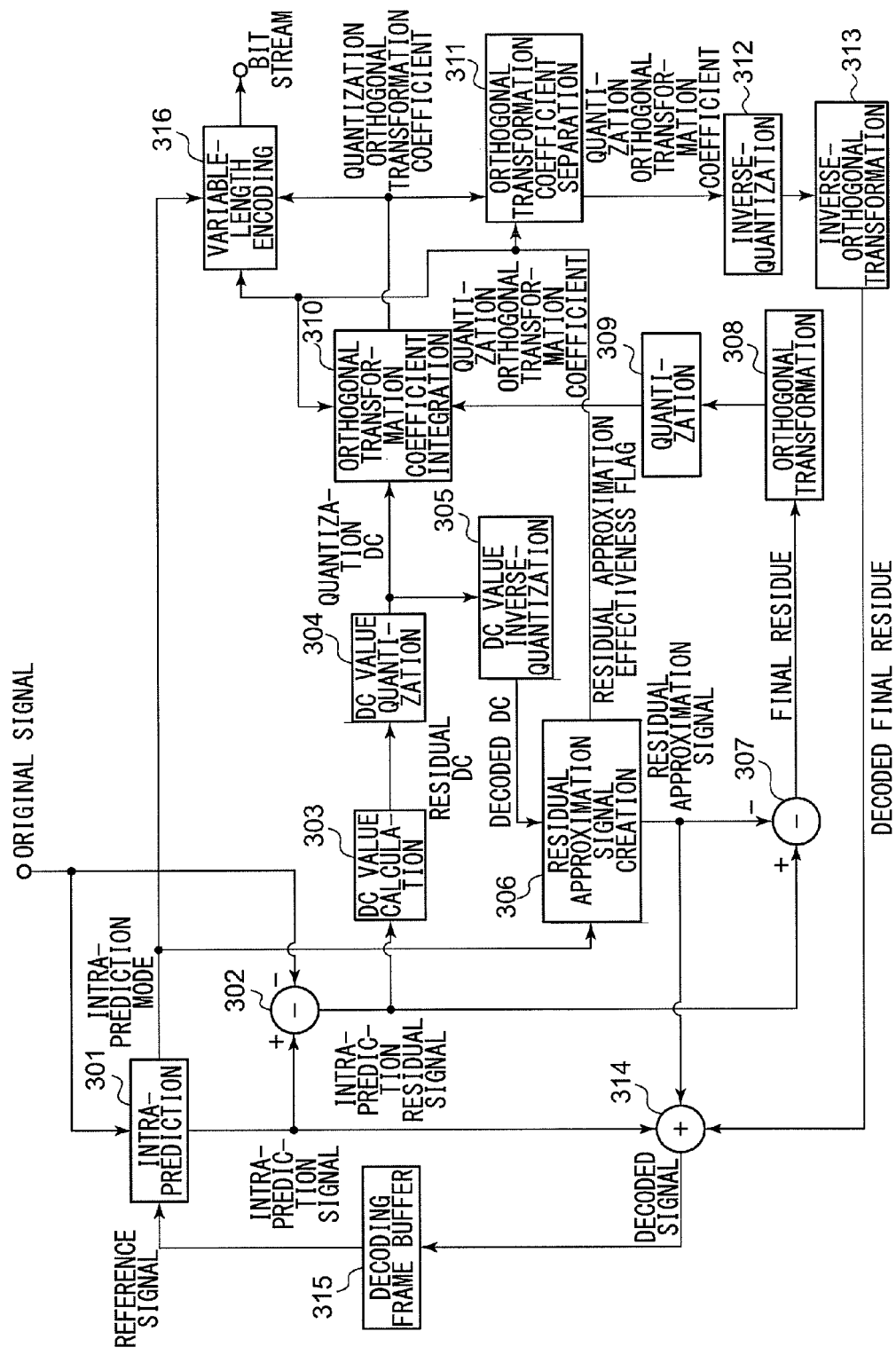
FIG. 3 is a block diagram of an image encoding apparatus according to an embodiment.

FIG. 3 is a block diagram of an image encoding apparatus according to an embodiment. The image encoding apparatus includes an intra-prediction unit 301 that creates an intra-prediction signal of an encoding target block, a subtraction unit 302 that calculates a prediction residue of a intra-prediction image, a DC value calculation unit 303 that calculates a DC component of the prediction residue of the intra-prediction, a DC value quantization unit 304 that quantizes the DC component of the prediction residue, a DC value inverse-quantization unit 305 that decodes the quantized DC component of the prediction residue, a residual approximation signal creation unit 306 that creates a linear approximation signal of the prediction residue, a subtraction unit 307 that calculates a final residual component, an orthogonal transformation unit 308 and a quantization unit 309 that perform encoding processing of the final residual component, an orthogonal transformation coefficient integration unit 310 that integrates a DC component and an AC component of an encoding coefficient, an orthogonal transformation coefficient separation unit 311 that separates a DC component and an AC component of an orthogonal transformation coefficient, an inverse-quantization unit 312 and an inverse-orthogonal transformation unit 313 that perform decoding processing of a quantization orthogonal transformation coefficient, an adding unit 314 that calculates a local decoded signal, a decoding frame buffer 315 that stores a decoded signal, and a variable-length encoding unit 316 that converts encoding information into an output bit stream.

The intra-prediction unit 301 acquires an original signal of an encoding target block, and acquires a prediction reference signal of an intra-prediction from the decoding frame buffer 315. The intra-prediction unit 301 determines an optimal intra-prediction mode, and generates an intra-prediction signal of the encoding target block as a first prediction value.

The determination process of the intra-prediction mode is similar to a conventional process. For example, a candidate intra-prediction mode is determined in accordance with the form of the original signal. Alternatively, the intra-prediction signal of all candidate intra-prediction mode is created, and a mode having a minimum evaluation value with respect to the original signal is considered to be the optimal intra-prediction mode. As the evaluation value, an absolute value difference sum, a least squares error, or a bit length generated by temporary encoding of the target block is used.

The intra-prediction unit 301 transfers the determined intra-prediction mode to the residual approximation signal creation unit 306 and the variable-length encoding unit 316, and transfers the generated intra-prediction signal to the subtraction unit 302 and the adding unit 314.

The subtraction unit 302 acquires the original signal of the encoding target block, and acquires the intra-prediction signal from the intra-prediction unit 301. The subtraction unit 302 calculates a prediction residue (first residual signal) of the intra-prediction image by subtracting the intra-prediction signal from the original signal. The subtraction unit 302 transfers the calculated prediction residue to the DC value calculation unit 303 and the subtraction unit 307.

The DC value calculation unit 303 acquires the prediction residue of the intra-prediction image from the subtraction unit 302, calculates a DC value of the prediction residue, and transfers the calculated DC value to the DC value quantization unit 304.

The DC value quantization unit 304 acquires the DC value of the prediction residue from the DC value calculation unit 303, performs a predetermined quantization processing of the DC value of the prediction residue, and calculates a residual DC quantization value. The DC value quantization unit 304 transfers the residual DC quantization value to the DC value inverse-quantization unit 305 and the orthogonal transformation coefficient integration unit 310.

The DC value inverse-quantization unit 305 acquires the residual DC quantization value from the DC value quantization unit 304, performs a predetermined inverse-quantization processing of the residual DC quantization value, and calculates a decoded residual DC value (first DC component of the residual signal). The DC value inverse-quantization unit 305 transfers the decoded residual DC value to the residual approximation signal creation unit 306.

The residual approximation signal creation unit 306 acquires information of the used intra-prediction mode from the intra-prediction unit 301, and acquires the decoded residual DC value from the DC value inverse-quantization unit 305.

The residual approximation signal creation unit 306 evaluates effectiveness of an residual approximation, and calculates a residual approximation effectiveness flag. The residual approximation effectiveness flag takes one of three conditions: implicitly ineffective, explicitly ineffective, and explicitly effective, and values 0, 1, and 2 are respectively allocated to the three conditions.

The residual approximation signal creation unit 306 causes the residual approximation to be implicitly ineffective when the decoded residual DC value is "0" or when the intra-prediction mode is the DC mode, and allocates "2" that indicates implicitly ineffective, to the residual approximation effectiveness flag.

The residual approximation signal creation unit 306 creates a residual approximation signal using the decoded residual DC value, and determines the effectiveness of the residual approximation when the decoded residual DC value is not "0" and when the intra-prediction mode is not the DC mode. For example, a plane that passes through the decoded residual DC value at the central position of the encoding target block, and linearly approximates a sample point of the residual signal is obtained by least squares method, and a corresponding point on the plane is considered to be the residual approximation signal. Note that, in the present embodiment, the position of the decoded residual DC value where the above-described linear approximation plane passes through is not limited to the central position of the encoding target block. The position may be a reference signal position, a head position of the encoding target block, or a position between the reference signal position and the head position of the encoding target block.

The residual approximation signal creation unit 306 further performs error evaluation of the residual approximation signal, determines the effectiveness of the residual approximation, and allocates either "0" that indicates explicitly ineffective, or "1" that indicates explicitly effective, to the residual approximation effectiveness flag. For example, the residual components are compared between the cases where the residual approximation is performed and where not performed. If the final residual component becomes smaller in the case where the residual approximation is performed, the residual approximation is determined to be explicitly effective, and if this is not the case, the residual approximation is determined to be explicitly ineffective. In error evaluation, similar to the determination in the intra-prediction unit 301, an absolute value difference sum, a least squares error, or a bit length generated by temporary encoding of the target block is used. Further, the determination of the intra-prediction mode and the effectiveness of the residual approximation can be simultaneously performed instead of being separately performed.

The residual approximation signal creation unit 306 causes the residual approximation signal to be "0" when the residual approximation is caused to be explicitly ineffective, or to be implicitly ineffective.

The residual approximation signal creation unit 306 transfers the residual approximation effectiveness flag to the orthogonal transformation coefficient integration unit 310, the orthogonal transformation coefficient separation unit 311, and the variable-length encoding unit 316, and transfers the residual approximation signal to the subtraction unit 307 and the adding unit 314.

Figure 1:
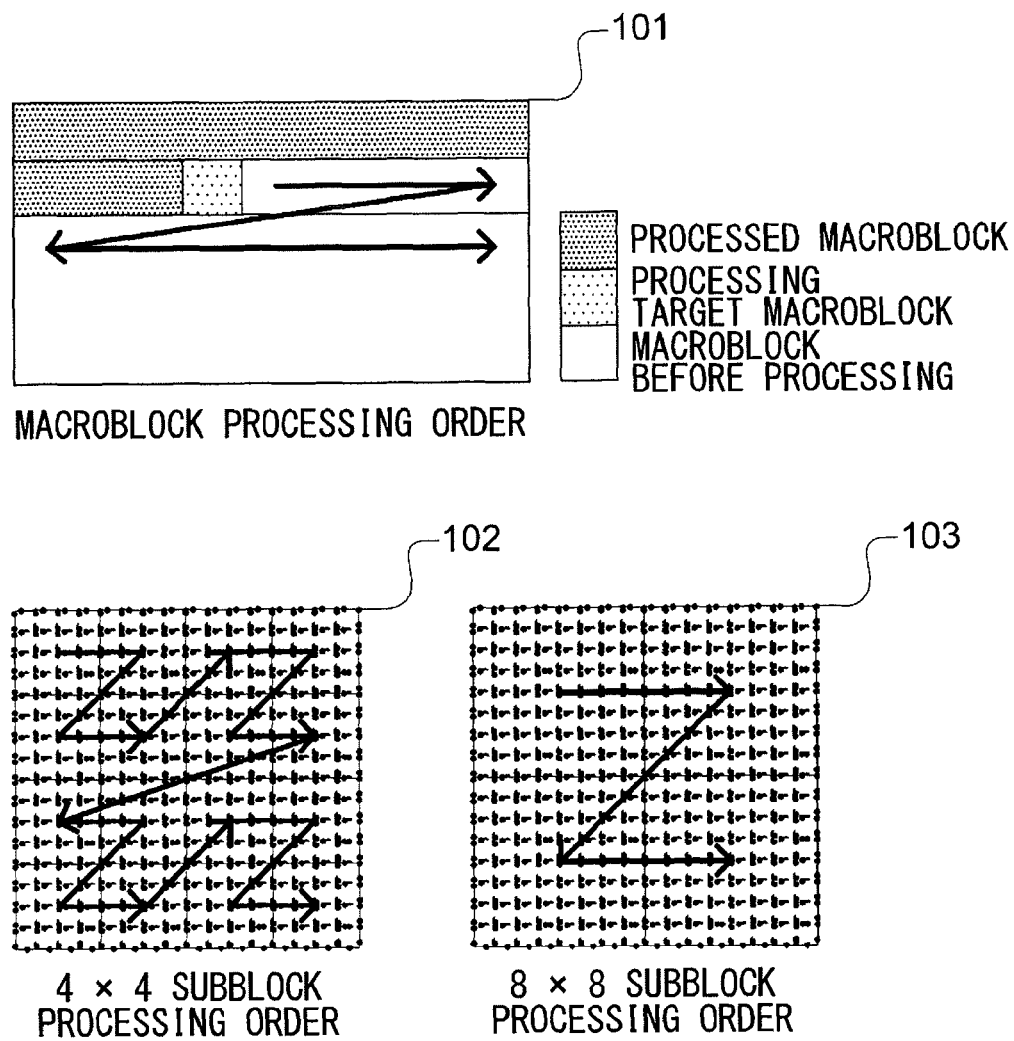
FIG. 1 is a diagram showing a processing order of encoding of a macroblock.
Figure 2:
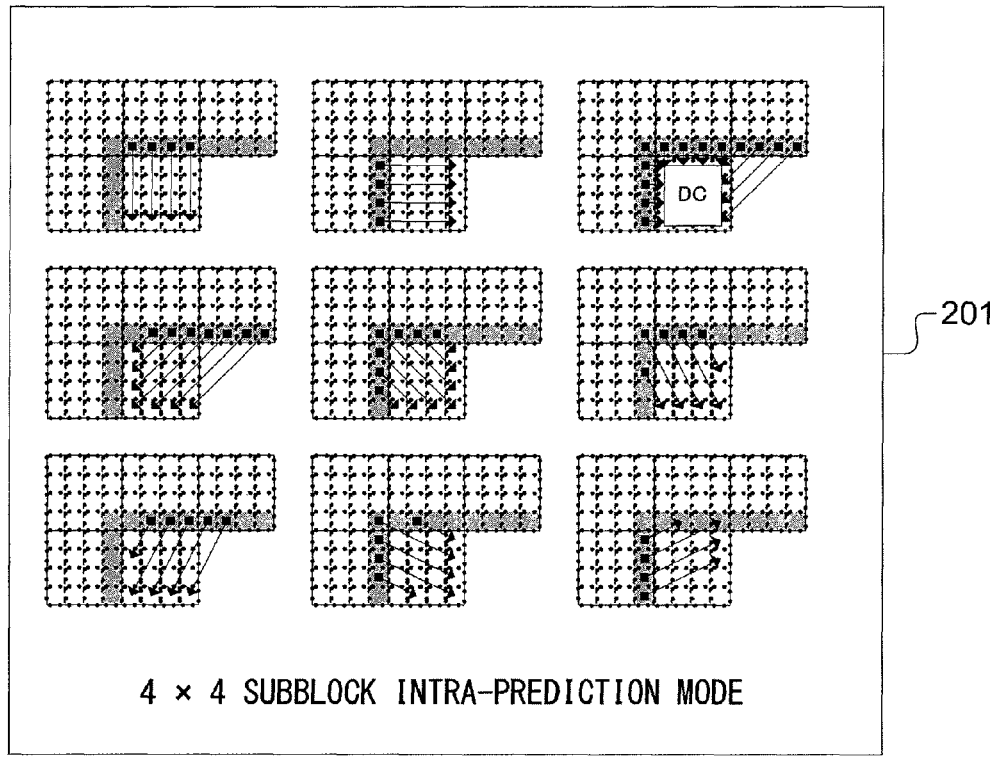
FIG. 2 is a diagram illustrating intra-prediction processing.
Figure 2:
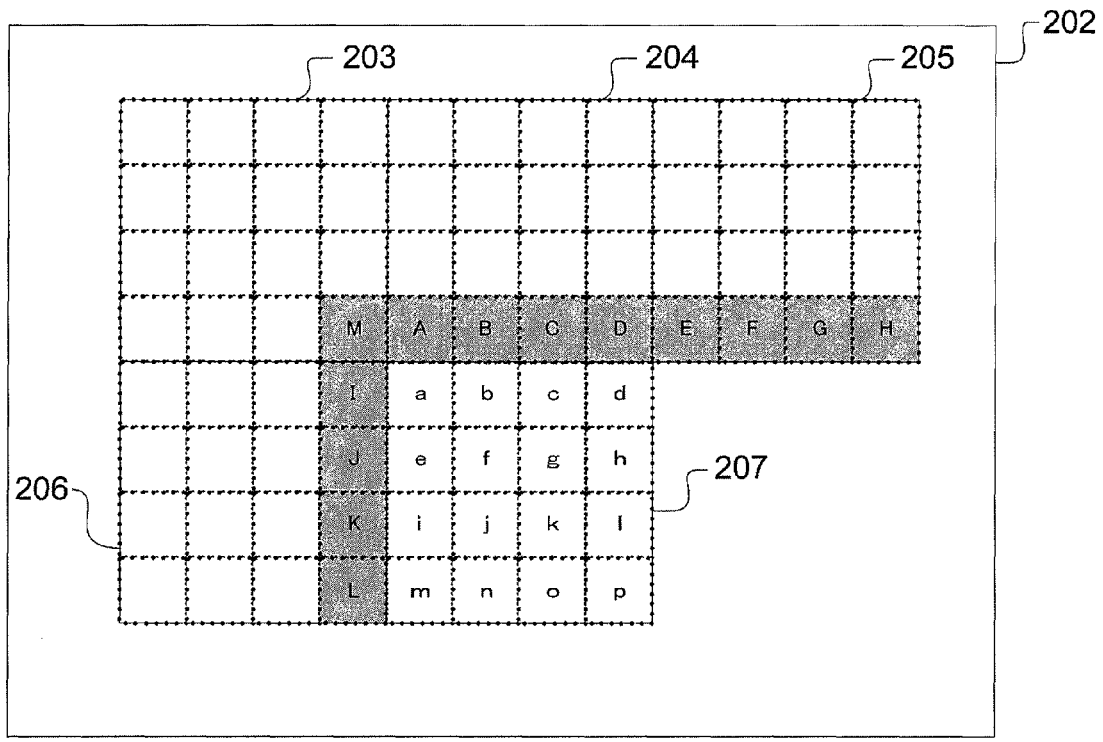

In addition to the creation process of the residual approximation signal described above, an inclination direction of the residual approximation signal can be controlled. For example, the inclination direction of the residual approximation signal is assumed to be the residual approximation mode, and any one of the directions that corresponds to the candidate intra-prediction mode denoted by 201 in FIG. 2 is taken. In that case, an additional encoding amount can be reduced by referring to the intra-prediction mode of the determined block and determining a smaller allocation value with respect to the residual approximation mode with high occurrence frequency.

The subtraction unit 307 acquires the prediction residue from the subtraction unit 302, and acquires the residual approximation signal from the residual approximation signal creation unit 306. The subtraction unit 307 calculates a final residual component (second residual signal) by subtracting the linear approximation signal of the prediction residue from the prediction residual signal (first residual signal). Here, the final residual component (second residual signal), which is an output of the subtraction unit 307, becomes equivalent to the prediction residue (first residual signal) because the residual approximation signal is "0" when the residual approximation is determined to be ineffective in the residual approximation signal creation unit 306. The subtraction unit 307 transfers the calculated final residual component to the orthogonal transformation unit 308.

The orthogonal transformation unit 308 and the quantization unit 309 acquire the final residual component from the subtraction unit 307, perform predetermined orthogonal transformation/quantization processing of the final residual component, and calculate a quantization orthogonal transformation coefficient of the final residual component. The quantization unit 309 transfers the quantization orthogonal transformation coefficient of the final residual component to the orthogonal transformation coefficient integration unit 310. The final residual component, which is an input of the orthogonal transformation unit 308, becomes equivalent to the prediction residue, and an output of the quantization unit 309 becomes the quantization orthogonal transformation coefficient of the prediction residue when the residual approximation is determined to be ineffective in the residual approximation signal creation unit 306.

The orthogonal transformation coefficient integration unit 310 acquires the residual DC quantization value from the DC value quantization unit 304, acquires the quantization orthogonal transformation coefficient of the final residual component from the quantization unit 309, and further acquires the residual approximation effectiveness flag from the residual approximation signal creation unit 306. The orthogonal transformation coefficient integration unit 310 calculates a quantization orthogonal transformation coefficient of an integration residual component (third residual signal) obtained by integrating the AC component and the DC component by substituting the residual DC quantization value (quantization value of the DC component of the first residual signal) into a DC value position of the quantization orthogonal transformation coefficient of the final residual component (second residual signal). The orthogonal transformation coefficient integration unit 310 transfers the integration residual component quantization orthogonal transformation coefficient to the orthogonal transformation coefficient separation unit 311 and the variable-length encoding unit 316.

Here, when the residual approximation effectiveness flag is "0" that indicates explicitly ineffective, or "2" that indicates implicitly ineffective, the residual DC quantization value (quantization value of the DC component of the first residual signal) and the DC component of the final residual component (second residual signal) quantization orthogonal transformation coefficient become an equivalent value. Therefore, the processing of substituting the residual DC quantization value into the DC value position of the final residual component quantization orthogonal transformation coefficient can be omitted, and the final residual component quantization orthogonal transformation coefficient as is can be the integration residual component (third residual signal) quantization orthogonal transformation coefficient.

As described above, when the residual approximation is implicitly determined to be ineffective, since the final residual component (second residual signal) is equivalent to the prediction residue (first residual signal), the integration residual component (third residual signal) subjected to variable-length encoding in the variable-length encoding unit 316 is the prediction residue (first residual signal) itself. Therefore, in that case, if the prediction residue (first residual signal) is subjected to orthogonal transformation/quantization processing as the final residual component (second residual signal), the processing of the orthogonal transformation coefficient integration unit 310 can be omitted, the processing being integrating the AC component and the DC component by substituting the residual DC quantization value (quantization value of the DC component of the first residual signal) into the DC value position of the final residual component (second residual signal) quantization orthogonal transformation coefficient.

The orthogonal transformation coefficient separation unit 311 acquires the integration residual component quantization orthogonal transformation coefficient from the orthogonal transformation coefficient integration unit 310, and acquires the residual approximation effectiveness flag from the residual approximation signal creation unit 306.

When the residual approximation effectiveness flag is "0" that indicates explicitly ineffective, or "2" that indicates implicitly ineffective, the orthogonal transformation coefficient separation unit 311 transfers the integration residual component quantization orthogonal transformation coefficient as is to the inverse-quantization unit 312 as the residual component quantization orthogonal transformation coefficient.

When the residual approximation effectiveness flag is "1" that indicates explicitly effective, the orthogonal transformation coefficient separation unit 311 calculates a residual AC component quantization orthogonal transformation coefficient by substituting "0" into the DC value of the integration residual component quantization orthogonal transformation coefficient, and transfers the residual AC component quantization orthogonal transformation coefficient to the inverse-quantization unit 312.

The inverse-quantization unit 312 and the inverse-orthogonal transformation unit 313 acquire the residual component quantization orthogonal transformation coefficient or the residual AC component quantization orthogonal transformation coefficient from the orthogonal transformation coefficient separation unit 311, perform predetermined inverse-quantization/inverse-orthogonal transformation of the residual component quantization orthogonal transformation coefficient or the residual AC component quantization orthogonal transformation coefficient, and calculates a decoded residual component. The inverse-orthogonal transformation unit 313 transfers the decoded residual component to the adding unit 314.

The adding unit 314 acquires the intra-prediction signal from the intra-prediction unit 301, acquires the residual approximation signal from the residual approximation signal creation unit 306, and acquires the decoded residual component from the inverse-orthogonal transformation unit 313. The adding unit 314 calculates a local decoded signal by adding the intra-prediction signal, the residual approximation signal, and the decoded residual component, and transfers the calculated local decoded signal to the decoding frame buffer 315.

The decoding frame buffer 315 acquires the local decoded signal from the adding unit 314 and holds it. Further, from decoding frame buffer 315, a signal of the prediction reference position is transferred to the intra-prediction unit 301 as the reference signal of the intra-prediction.

The variable-length encoding unit 316 acquires the intra-prediction mode information from the intra-prediction unit 301, acquires the residual approximation effectiveness flag from the residual approximation signal creation unit 306, and further, acquires the integration residual component quantization orthogonal transformation coefficient from the orthogonal transformation coefficient integration unit 310. The variable-length encoding unit 316 performs predetermined variable-length encoding of the intra-prediction mode information and the integration residual component quantization orthogonal transformation coefficient, and creates an encoded stream. With respect to the residual approximation effectiveness flag, in the case where the residual approximation effectiveness flag is "2" that indicates implicitly ineffective, the variable-length encoding unit 316 does not transfer the residual approximation effectiveness flag as encoding data. However, if this is not the case, that is, in the cases of "0" that indicates explicitly ineffective, or "1" that indicates explicitly effective, the residual approximation effectiveness flag is also subjected to the valuable-length encoding, and the encoded stream is created.

Figure 6:
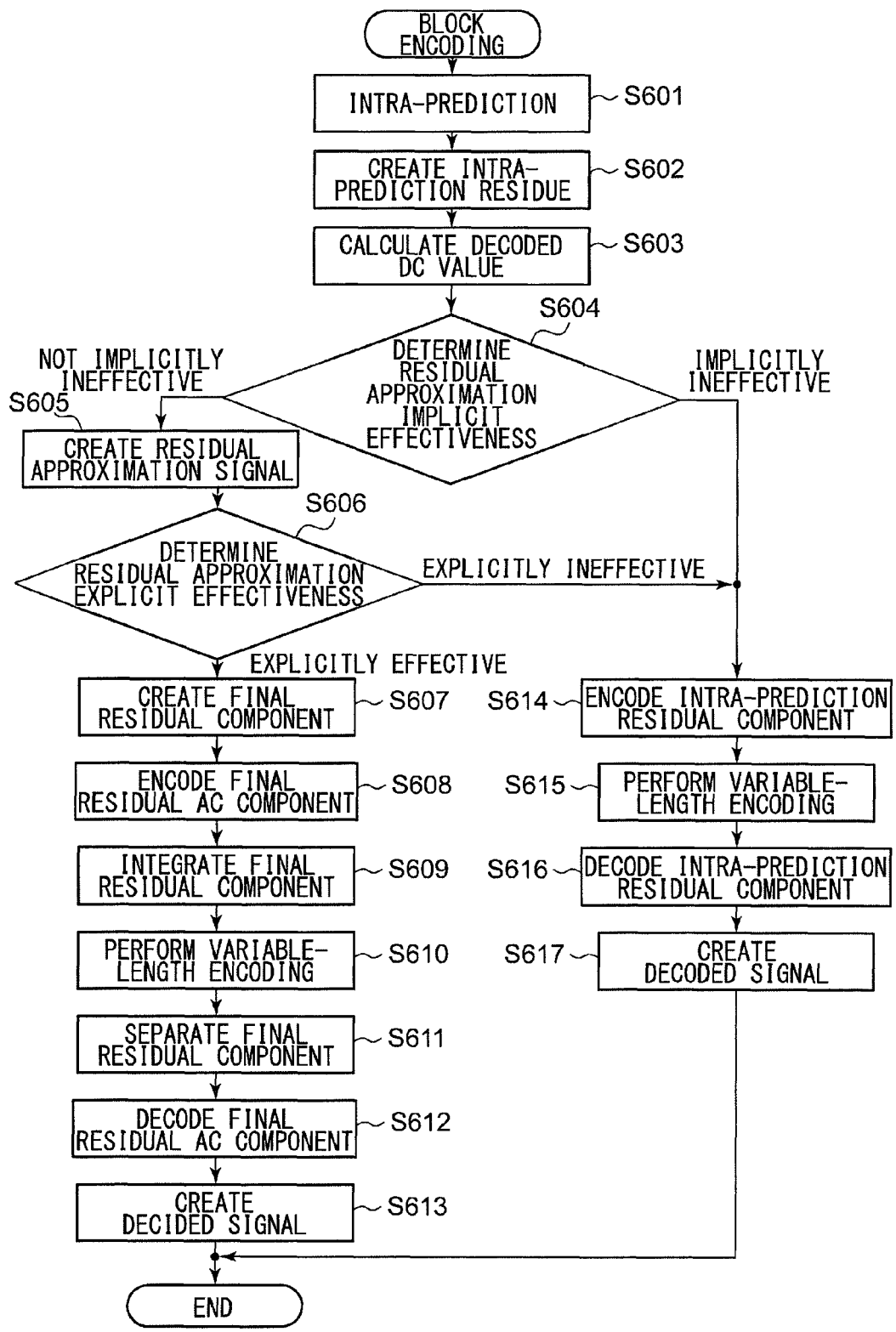
FIG. 6 is a flowchart showing a process of encoding processing of one block according to the encoding apparatus of the present invention.

Next, a process of encoding a block by an image encoding apparatus according to the present embodiment will be described with reference to the flowchart of FIG. 6.

In intra-prediction signal generation processing of step S601, the intra-prediction unit 301 receives an input of the original signal of the encoding target block, and creates an intra-prediction signal of the encoding target block under an optimal intra-prediction mode using the reference signal of the intra-prediction stored in the decoding frame buffer 315, and the process proceeds to step S602.

In intra-prediction residual signal calculation processing of step S602, the subtraction unit 302 calculates a prediction residue of the intra-prediction by subtracting the intra-prediction signal from the original signal of the encoding target block, and the process proceeds to step S603.

In decoded DC value calculation processing of the residual signal of step S603, the DC value calculation unit 303, the DC value quantization unit 304, and the DC value inverse-quantization unit 305 calculate a decoded residual DC value by calculating, quantizing, and further, inversely quantizing a DC value of the prediction residual signal, and the process proceeds to step S604.

In implicit effectiveness determination processing of the residual approximation of step S604, the residual approximation signal creation unit 306 determines whether the residual approximation is implicitly effective. The residual approximation signal creation unit 306 determines that the residual signal of the intra-prediction does not have a strong correlation in one direction and determines the residual approximation signal is implicitly ineffective when the decoded residual DC value is "0", or the intra-prediction mode is the DC mode, allocates "2" that indicates implicitly ineffective, to the residual approximation effectiveness flag, and the process proceeds to step S614.

The residual approximation signal creation unit 306 determines that the residual approximation is not implicitly ineffective when the intra-prediction mode is not the DC mode, and the decoded residual DC value is not "0", puts off the allocation to the residual approximation effectiveness flag, and the process proceeds to step S605.

In residual approximation signal creation processing of step S605, the residual approximation signal creation unit 306 creates a residual approximation signal from the decoded residual DC value under the determined intra-prediction mode. For example, a linear approximation plane that passes through the decoded residual DC value at the central position of the encoding target block is obtained by a least squares method using a sample point of the residual signal, and the residual signal is approximated with this plane. Then, the process proceeds to step S606.

In explicit effectiveness determination processing of the residual approximation of step S606, the residual approximation signal creation unit 306 determines whether the residual approximation is explicitly effective. The residual approximation signal creation unit 306 performs error evaluation of the residual approximation signal, determines the residual approximation is explicitly effective when an error becomes smaller when the residual approximation is performed, compared with the original residual signal, and sets the residual approximation effectiveness flag to the value 1 that indicates explicitly effective, and the process proceeds to step S607. In the meantime, the residual approximation signal creation unit 306 determines the residual approximation is explicitly ineffective when the error does not become smaller even if the residual approximation is performed, sets the residual approximation effectiveness flag to the value 0 that indicates explicitly ineffective, and the process proceeds to step S614.

In final residual signal creation processing of step S607, the subtraction unit 307 calculates a final residual component by subtracting the residual approximation signal from the prediction residue, and the process proceeds to step S608.

In encoding processing of the final residual AC component of step S608, the orthogonal transformation unit 308 and the quantization unit 309 perform predetermined orthogonal transformation/quantization processing of the final residual component, calculate a quantization orthogonal transformation coefficient of the final residual component, and the process proceeds to step S609.

In final residual component creation processing of step S609, the orthogonal transformation coefficient integration unit 310 calculates an integration residual component quantization orthogonal transformation coefficient by substituting the residual DC quantization value into a DC value position of the quantization orthogonal transformation coefficient of the final residual component. Note that the process proceeds to this step only when the residual approximation effectiveness flag is "1". Then, the process proceeds to step S610.

In variable-length encoding processing of encoding information of step S610, the variable-length encoding unit 316 performs variable-length encoding of the intra-prediction mode information, the residual approximation effectiveness flag, and the integration residual component quantization orthogonal transformation coefficient, and generates an encoded stream. Note that, the process proceeds to this step only when the residual approximation effectiveness flag is "1". Then, the process proceeds to step S611.

In separation processing of the final residual component of step S611, the orthogonal transformation coefficient separation unit 311 calculates a residual AC component quantization orthogonal transformation coefficient by substituting "0" into the DC value of the integration residual component quantization orthogonal transformation coefficient. Note that the process proceeds to this step only when the residual approximation effectiveness flag is "1". Then, the process proceeds to step S612.

In decoding processing of the final residual AC component of step S612, the inverse-quantization unit 112 and the inverse-orthogonal transformation unit 313 perform the inverse-quantization/inverse-orthogonal transformation of the residual AC component quantization orthogonal transformation coefficient, calculate a decoded residual AC component, and the process proceeds to step S613.

In decoded signal creation processing of step S613, the adding unit 314 calculates a local decoded signal by adding the intra-prediction signal, the residual approximation signal, and the decoded residual AC component, and stores the local decoded signal in the decoding frame buffer 315. Accordingly, the encoding processing of a block in the case where the residual approximation is explicitly effective is completed.

In the case where the residual approximation is explicitly ineffective, the encoding processing of the intra-prediction residual component of step S614 is performed. At the start of this step, the residual approximation effectiveness flag is set to be either "0" that indicates explicitly ineffective, or "2" that indicates implicitly ineffective, and the residual approximation signal is set to be "0".

In step S614, the subtraction unit 307 calculates a final residual component by subtracting the residual approximation signal from the prediction residue. Alternatively, since the residual approximation signal is "0", it is equivalent to maintain the prediction residue as is as the final residual component. Then, the orthogonal transformation unit 308 and the quantization unit 309 perform orthogonal transformation/ quantization processing of the final residual component, and calculate a quantization orthogonal transformation coefficient of the final residual component. Then, the process proceeds to step S615.

In variable-length encoding processing of the encoding information of step S615, the orthogonal transformation coefficient integration unit 310 outputs the quantization orthogonal transformation coefficient of the final residual component as is as an integration residual component quantization orthogonal transformation coefficient because the residual approximation effectiveness flag is "0" that indicates explicitly ineffective, or "2" that indicates implicitly ineffective. The variable-length encoding unit 316 performs variable-length encoding processing of the intra-prediction mode information, the residual approximation effectiveness flag, and the integration residual component quantization orthogonal transformation coefficient, and generates an encoded stream. The process proceeds to this step only when the residual approximation effectiveness flag is "0" that indicates explicitly ineffective, or "2" that indicates implicitly ineffective, and the variable-length encoding unit 316 does not perform encoding of the residual approximation effectiveness flag in the case where the residual approximation effectiveness flag is "2" that indicates implicitly ineffective. If this is not the case, that is, in the case of "0" that indicates explicitly ineffective, the variable-length encoding unit 316 performs the variable-length encoding of the residual approximation effectiveness flag, and creates an encoded stream. Then, the process proceeds to step S616.

In decoding processing of the intra-prediction residual component of step S616, the orthogonal transformation coefficient separation unit 311 outputs the integration residual component quantization orthogonal transformation coefficient as is as the residual component quantization orthogonal transformation coefficient because the residual approximation effectiveness flag is "0" that indicates explicitly ineffective, or "2" that indicates implicitly ineffective. The inverse-quantization unit 112 and the inverse-orthogonal transformation unit 313 perform inverse-quantization/inverse-orthogonal transformation of the residual component quantization orthogonal transformation coefficient, and calculates a decoded residual component. Then, the process proceeds to step S617.

In decoded signal creation processing of step S617, the adding unit 314 calculates a local decoded signal by adding the intra-prediction signal and the decoded residual component, and stores the calculated local decoded signal in the decoding frame buffer 315. Accordingly, the encoding processing of a block in the case where the residual approximation effectiveness flag is explicitly ineffective or implicitly ineffective is completed.

Next, decoding of one block in an image decoding apparatus that decodes an image encoded in the image encoding apparatus of the present embodiment will be exemplarily described.

Figure 7:
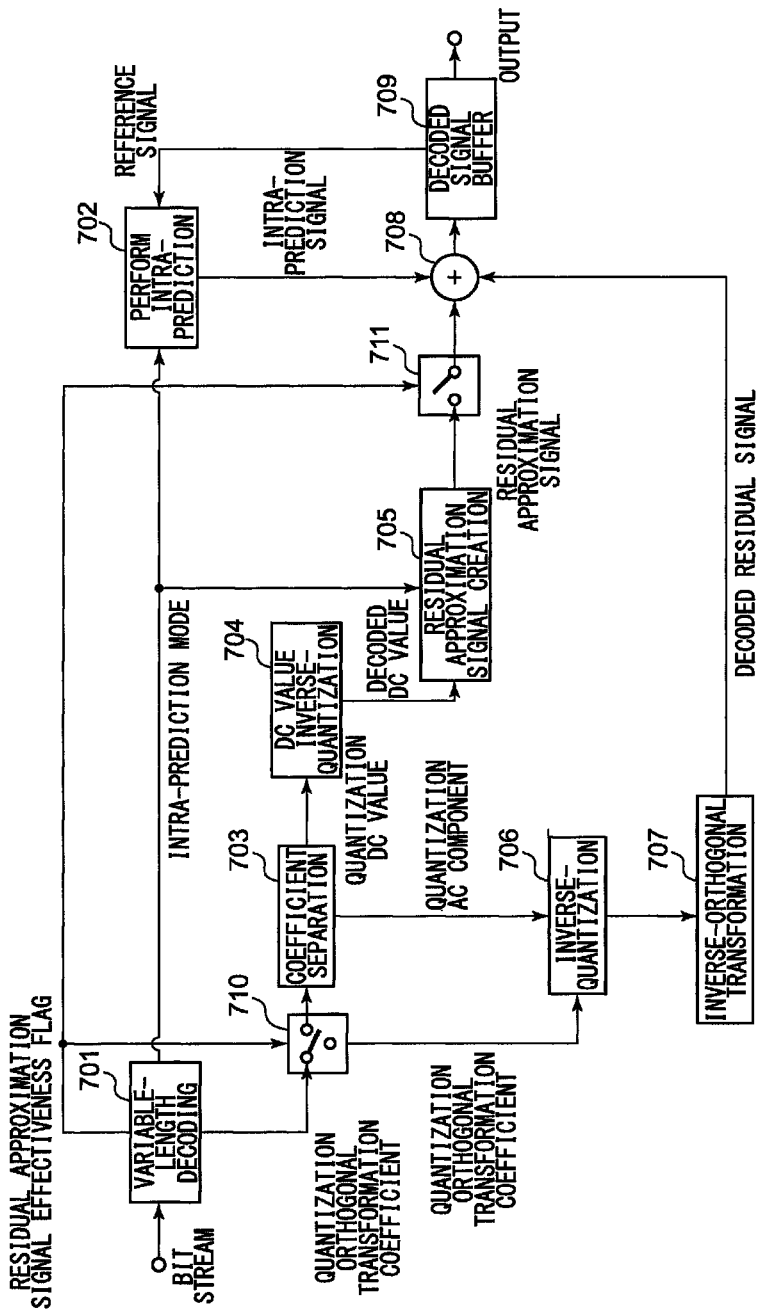
FIG. 7 is a block diagram of an image decoding apparatus according to the embodiment.

FIG. 7 is a block diagram of an image decoding apparatus according to the embodiment. The image decoding apparatus includes a variable-length decoding unit 701 that analyzes the syntax of an input bit stream and performs variable-length decoding, an intra-prediction unit 702 that creates an intra-prediction signal of a decoding target block, an orthogonal transformation coefficient separation unit 703 that separates a DC component and an AC component of an orthogonal transformation coefficient, a DC value inverse-quantization unit 704 that decodes a quantized DC component of a prediction residue, a residual approximation signal creation unit 705 that creates a linear approximation signal of the prediction residue, an inverse-quantization unit 706 and an inverse-orthogonal transformation unit 707 that perform decoding processing of a residual component, an adding unit 708 that calculates a decoded signal, a decoding frame buffer 709 that stores the decoded signal, and switches 710 and 711 that switch a flow of the process based on effectiveness of the residual approximation signal.

The variable-length decoding unit 701 inputs a bit stream, analyzes the syntax, and performs variable-length decoding of an intra-prediction mode information and a quantization orthogonal transformation coefficient. The variable-length decoding unit 701 transfers the intra-prediction mode to the intra-prediction unit 702 and the residual approximation signal creation unit 705, and transfers the quantization orthogonal transformation coefficient to the switch 711.

Further, the variable-length decoding unit 701 decodes the residual approximation signal effectiveness flag. In the present embodiment, an inclination level of the residual approximation signal is determined using the decoded DC value. Also, an inclination direction of the residual approximation signal is determined using the intra-prediction mode. In the case where the decoded DC value is "0", or the intra-prediction mode is the DC mode, it is determined that the residual signal of the intra-prediction does not have a strong correlation in one direction, and the residual approximation signal is caused to be implicitly ineffective.

The variable-length decoding unit 701 implicitly determines that the residual approximation signal effectiveness flag is "0" that indicates ineffective, in the cases where the intra-prediction mode is the DC mode, or the DC component of the quantization orthogonal transformation coefficient is "0". If this is not the case, that is, in the case where the intra-prediction mode is not the DC mode and the DC component of the quantization orthogonal transformation coefficient is not "0", the variable-length decoding unit 701 explicitly decodes the residual approximation signal effectiveness flag, and determines whether effective or ineffective.

The variable-length decoding unit 701 transfers the determined or decoded residual approximation signal effectiveness flag to the switches 710 and 711.

The intra-prediction unit 702 acquires the intra-prediction mode from the variable-length decoding unit 701, and acquires the prediction reference signal of the intra-prediction from the decoding frame buffer 709. The intra-prediction unit 702 performs predetermined intra-prediction processing under the intra-prediction mode using the prediction reference signal, and creates an intra-prediction signal. The process of the intra-prediction processing is similar to a conventional process. The intra-prediction unit 702 transfers the created intra-prediction signal to the adding unit 708.

The orthogonal transformation coefficient separation unit 703 acquires the quantization orthogonal transformation coefficient from the switch 710, and separates a DC value and an AC component of the quantization orthogonal transformation coefficient. The orthogonal transformation coefficient separation unit 703 transfers the quantization DC value to the DC value inverse-quantization unit 704, and transfers the quantization AC component to the inverse-quantization unit 706.

The DC value inverse-quantization unit 704 acquires the quantization DC value of the prediction residue from the orthogonal transformation coefficient separation unit 703, performs predetermined inverse-quantization processing of the quantization DC value of the prediction residue, and calculates a decoded DC value. The DC value inverse-quantization unit 704 transfers the calculated decoded DC value to the residual approximation signal creation unit 705.

The residual approximation signal creation unit 705 acquires the intra-prediction mode from the variable-length decoding unit 701, and acquires the decoded DC value from the DC value inverse-quantization unit 704. The residual approximation signal creation unit 705 creates a residual approximation signal using the decoded DC value. Similar to the residual approximation signal creation unit 306 of the encoding apparatus, for example, a plane that passes through the decoded residual DC value at the central position of the encoding target block, and linearly approximates a sample point of the residual signal is obtained by a least squares method, and a corresponding point of this plane is considered to be the residual approximation signal. The residual approximation signal creation unit 705 transfers the residual approximation signal to the switch 711.

The inverse-quantization unit 706 and the inverse-orthogonal transformation unit 707 acquire the quantization orthogonal transformation coefficient from the switch 710, or acquire the quantization AC component from the orthogonal transformation coefficient separation unit 703. The inverse-quantization unit 706 and the inverse-orthogonal transformation unit 707 perform predetermined inverse-quantization processing/inverse-orthogonal transformation processing of the acquired quantization orthogonal transformation coefficient or the quantization AC component, creates a decoded residual signal, and transfers the created decoded residual signal to the adding unit 708.

The adding unit 708 acquires the intra-prediction signal from the intra-prediction unit 702, acquires the decoded residual signal from the inverse-orthogonal transformation unit 707, and acquires the residual approximation signal from the switch 711. The adding unit 708 creates a decoded signal by adding the intra-prediction signal, the decoded residual signal, and the residual approximation signal, and transfers the created decoded signal to the decoding frame buffer 709.

A decoding frame buffer 709 acquires the decoded signal of the target block from the adding unit 708 and holds it. Further, from the decoding frame buffer 709, a signal of the prediction reference position is transferred to the intra-prediction unit 702 as the reference signal of the intra-prediction.

The switch 710 acquires the quantization orthogonal transformation coefficient and the residual approximation signal effectiveness flag from the variable-length decoding unit 701. In the case where the residual approximation signal effectiveness flag is effective, the switch 710 connects the variable-length decoding unit 701 and the orthogonal transformation coefficient separation unit 703, and transfers the quantization orthogonal transformation coefficient to the orthogonal transformation coefficient separation unit 703. In the case where the residual approximation signal effectiveness flag is ineffective, the switch 710 connects the variable-length decoding unit 701 and the inverse-quantization unit 706, and transfers the quantization orthogonal transformation coefficient to the inverse-quantization unit 706.

The switch 711 acquires the residual approximation signal effectiveness flag from the variable-length decoding unit 701. In the case where the residual approximation signal effectiveness flag is effective, the switch 711 connects the residual approximation signal creation unit 705 and the adding unit 708, and transfers the residual approximation signal to the adding unit 708. In the case where the residual approximation signal effectiveness flag is ineffective, the switch 711 does not connect the residual approximation signal creation unit 705 and the adding unit 708.

Figure 8:
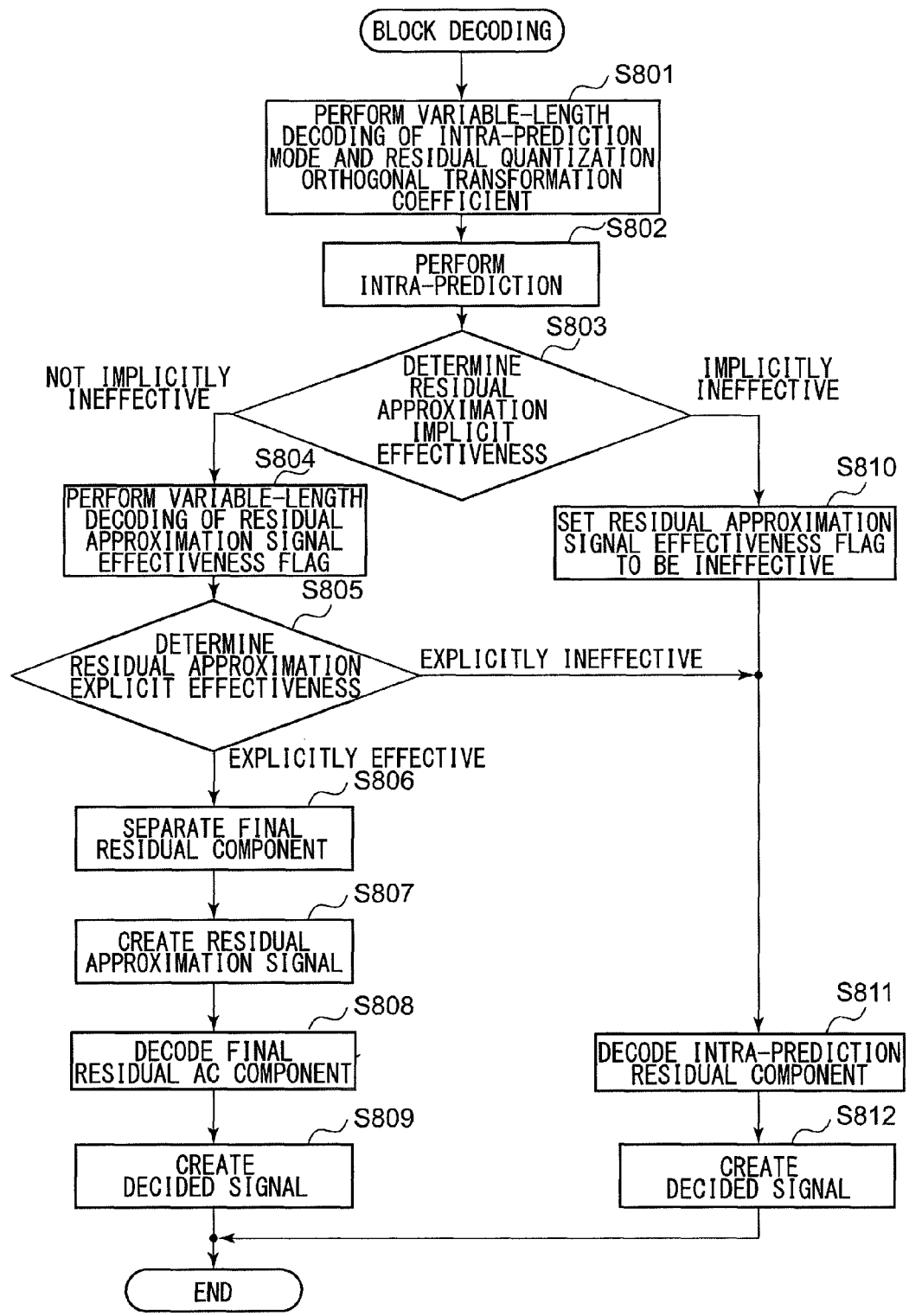
FIG. 8 is a flowchart showing a process of decoding processing of one block according to the decoding apparatus of the present invention.

Next, a process of decoding of one block by an image decoding apparatus according to the present embodiment will be described with reference to the flowchart in FIG. 8.

In variable-length decoding processing of step S801, the variable-length decoding unit 701 decodes the intra-prediction mode and the residual quantization orthogonal transformation coefficient, and the process proceeds to step S802.

In intra-prediction signal generation processing of step S802, the intra-prediction unit 702 creates an intra-prediction signal using the prediction reference signal of the intra-prediction stored in the decoding frame buffer 709 under the intra-prediction mode acquired from the variable-length decoding unit 701, and the process proceeds to step S803.

In implicit effectiveness determination processing of the residual approximation of step S803, the variable-length decoding unit 701 refers to the intra-prediction mode and the DC component of the quantization orthogonal transformation coefficient decoded in step S801, and determines whether the residual approximation is implicitly effective. The variable-length decoding unit 701 determines the residual approximation is implicitly ineffective in the case where the intra-prediction mode is the DC mode, or the DC component of the quantization orthogonal transformation coefficient is "0", and the process proceeds to step S810. If this is not the case, that is, in the case where the intra-prediction mode is not the DC mode, and the DC component of the quantization orthogonal transformation coefficient is not "0", the variable-length decoding unit 701 determines that the residual approximation is not implicitly ineffective, and the process proceeds to step S804.

In variable-length decoding processing of the residual approximation signal effectiveness flag of step S804, the variable-length decoding unit 701 explicitly performs decoding of the residual approximation signal effectiveness flag. The process proceeds to this step when the residual approximation effectiveness is not implicitly ineffective, that is, when the intra-prediction mode is not the DC mode and the DC component of the quantization orthogonal transformation coefficient is not "0". Then, the process proceeds to step S805.

In explicit effectiveness determination processing of the residual approximation of step S805, the variable-length decoding unit 701 determines whether the residual approximation is explicitly effective based on the value of the explicitly decoded residual approximation signal effectiveness flag, transfers the residual approximation signal effectiveness flag to the switches 710 and 711, and performs switching of the switches.

In the case where the residual approximation signal effectiveness flag is the value 2 that indicates explicitly effective, the switch 710 connects the variable-length decoding unit 701 and the orthogonal transformation coefficient separation unit 703, and transfers the quantization orthogonal transformation coefficient to the orthogonal transformation coefficient separation unit 703. Further, the switch 711 connects the residual approximation signal creation unit 705 and the adding unit 708, and transfers the residual approximation signal to the adding unit 708. Then, the process proceeds to step S806.

In the case where the residual approximation signal effectiveness flag is the value 1 that indicates explicitly ineffective, the switch 711 does not connect the residual approximation signal creation unit 705 and the adding unit 708, and the switch 710 connects the variable-length decoding unit 701 and the inverse-quantization unit 706, and transfers the quantization orthogonal transformation coefficient to the inverse-quantization unit 706. Then, the process proceeds to step S811.

The process proceeds to step S806 when the residual approximation effectiveness is effective, and the switch 710 is set to connect the variable-length decoding unit 701 and the orthogonal transformation coefficient separation unit 703. In separation processing of the final residual component of step S806, the orthogonal transformation coefficient separation unit 703 acquires the quantization orthogonal transformation coefficient from the variable-length decoding unit 701 via the switch 710, separates the DC value and the AC component of the quantization orthogonal transformation coefficient, transfers the quantization DC value to the DC value inverse-quantization unit 704, and the quantization AC component to the inverse-quantization unit 706. Then, the process proceeds to step S807.

In residual approximation signal creation processing of step S807, the DC value inverse-quantization unit 704 performs predetermined inverse-quantization processing of the quantization DC value of the prediction residue, and calculates a decoded DC value. The residual approximation signal creation unit 705 creates a residual approximation signal based on the decoded DC value under the intra-prediction mode. Then, the process proceeds to step S808.

The process proceeds to step S808 when the residual approximation effectiveness is effective, and the switch 710 is set to connect the variable-length decoding unit 701 and the orthogonal transformation coefficient separation unit 703. In decoding processing of the final residual AC component of step S808, the inverse-quantization unit 706 and the inverse-orthogonal transformation unit 707 perform predetermined inverse-quantization processing/inverse-orthogonal transformation processing of the quantization AC component, creates a decoded residual signal, and the process proceeds to step S809.

The process proceeds to step S809 when the residual approximation effectiveness is effective, and the switch 711 is set to connect the residual approximation signal creation unit 705 and the adding unit 708. In decoded signal creation processing of step S809, the adding unit 708 creates a decoded signal by adding the intra-prediction signal, the decoded residual signal, and the residual approximation signal, and stores it in the decoding frame buffer 709. Accordingly, the decoding of the decoding target block in the case where the residual approximation is explicitly effective is completed, and the process starts decoding of a next block.

The process proceeds to step S810 when the residual approximation effectiveness is implicitly ineffective, that is, the intra-prediction mode is the DC mode, or the DC component of the quantization orthogonal transformation coefficient is "0". In step S810, the variable-length decoding unit 701 sets the residual approximation signal effectiveness flag to the value that indicates implicitly ineffective, and transfers the residual approximation effectiveness flag that indicates implicitly ineffective to the switches 710 and 711. At this time, the switch 710 connects the variable-length decoding unit 701 and the inverse-quantization unit 706, and transfers the quantization orthogonal transformation coefficient to the inverse-quantization unit 706. The switch 711 is set not to connect the residual approximation signal creation unit 705 and the adding unit 708. Then, the process proceeds to step S811.

The process proceeds to step S811 when the residual approximation is ineffective, and the switch 710 is set to connect the variable-length decoding unit 701 and the inverse-quantization unit 706. In decoding processing of the intra-prediction residual component of step S811, the inverse-quantization unit 706 and the inverse-orthogonal transformation unit 707 perform inverse-quantization processing/inverse-orthogonal transformation processing of the acquired quantization orthogonal transformation coefficient, and create a decoded residual signal. Then, the process proceeds to step S812.

The process proceeds to step S812 when the residual approximation is ineffective, and the switch 711 is set not to connect the residual approximation signal creation unit 705 and the adding unit 708. In decoded signal creation processing of step S812, the adding unit 708 creates a decoded signal by adding the intra-prediction signal and the decoded residual signal, and stores the created decoded signal in the decoding frame buffer 709. Accordingly, the decoding of the decoding target block in the case where the residual approximation is implicitly ineffective or explicitly ineffective is completed, and the process starts decoding of a next block.

As described above, according to the image encoding apparatus of the embodiment, prior to the encoding of a residual component, a decoded DC value of the intra-prediction signal is calculated, a residual approximation signal is calculated using the decoded DC value of the intra-prediction signal, and a final residual component is obtained by subtracting an approximation signal determined based on the decoded DC value from the residual component of the intra-prediction signal, whereby information amount of the residual component to be encoded can be reduced.

In generating the approximation signal, the decoded DC value of the intra-prediction signal and the intra-prediction mode are referenced. The approximation signal is generated in the same inclination direction as the intra-prediction mode, wherein the DC value is the decoded DC value of the intra-prediction signal. The DC value of the approximation signal to be created is assumed to be equivalent to the decoded DC value of the intra-prediction, and the quantization orthogonal transformation coefficient of the final residual component is expressed only in the AC component, and the quantization DC value of the intra-prediction signal is substituted into the DC component of the quantization orthogonal transformation coefficient of the final residual component.

The amount of generated codes does not increase because the decoded DC value of the intra-prediction signal and the intra-prediction mode, which are referenced in generating the approximation signal, are the information that is inherently encoded. In the case where a structure is employed, which adaptively switches application/non-application of the residual approximation method per block, which is a unit of encoding, a flag of one bit that shows the application/non-application of the residual approximation may only be added per block in a unit of encoding. Therefore, the information amount of the residual component can be effectively reduced with a small increase of the information amount.

The above-described encoding and decoding processing can be realized by firmware stored in a ROM (read only memory), a flash memory, or the like, or software such as computer, as well as a transmission, an accumulation, and a reception apparatuses that use hardware. It is also possible to provide the firmware program and the software program by being recorded on a computer-readable recording medium, via a server through a wired or wireless network, or via data broadcasting of a ground wave or satellite digital broadcasting.

As described above, the present invention has been described with reference to the embodiment. It is understood by those skilled in the art that the embodiment is exemplarily described and that various changes and modifications in the arrangement or combination of each element and process thereof can be made without departing from the invention.

In the above-described embodiment, a prediction residual approximation signal is generated by linearly approximating a prediction residual signal by a least squares method. However, the prediction residual approximation signal may be linearly approximated by a method other than the least squares method. Also, the prediction residual signal may be approximated not only by the linear approximation but also by a predetermined function such as a quadratic function.

In the above-described embodiment, a method has been described wherein the prediction residual signal is approximated and the prediction residual signal is compression-encoded in an efficient manner by taking an image as an example. However, this compression encoding method can be applied to information other than an image. For example, the method can be applied to prediction encoding of one dimensional data such as audio data. Also, the method can be applied to prediction encoding of any data that changes in a time direction or in a space direction.

What is claimed is:

1. An image encoding apparatus, comprising:
an intra-prediction unit configured to generate an intra-prediction signal of an image;
a first subtraction unit configured to calculate a first residual signal from a difference between an original signal of the image and the intra-prediction signal;

a residual approximation signal creation unit configured to create a residual approximation signal by linearly approximating the first residual signal based on a DC component of the first residual signal;

a second subtraction unit configured to calculate a second residual signal from a difference between the first residual signal and the residual approximation signal;

an integration unit configured to generate a third residual signal by synthesizing the DC component of the first residual signal and the second residual signal; and a variable-length encoding unit configured to perform variable-length encoding of the third residual signal.

2. The image encoding apparatus according to claim 1, wherein
the residual approximation signal creation unit creates the residual approximation signal by linearly approximating the first residual signal based on the DC component of the first residual signal and an intra-prediction mode by the intra-prediction unit.

3. The image encoding apparatus according to claim 1, further comprising:
a DC component calculation unit configured to calculate the DC component of the first residual signal;
a DC component quantization unit configured to perform quantization of the DC component of the first residual signal; and
a DC component inverse-quantization unit configured to calculate a decoded DC component by performing inverse-quantization of the quantization DC component of the first residual signal,
wherein
the residual approximation signal creation unit linearly approximates the first residual signal using the decoded DC component as the DC component of the first residual signal.

4. The image encoding apparatus according to claim 1, wherein
the residual approximation signal creation unit determines effectiveness of residual approximation by performing error evaluation of the residual approximation signal, sets a flag indicating that the residual approximation is effective or ineffective, and supplies the flag to the variable-length encoding unit, and
the variable-length encoding unit performs variable-length encoding of the flag with the third residual signal.

5. The image encoding apparatus according to claim 1, wherein
the residual approximation signal creation unit determines that a residual approximation is ineffective when the DC component of the first residual signal is zero, or an intra-prediction mode by the intra-prediction unit is a DC mode, and
when the residual approximation signal creation unit determines that the residual approximation is ineffective, the third residual signal subjected to the variable-length encoding by the variable-length encoding unit is a signal obtained by causing the first residual signal to be the second residual signal, or the first residual signal.

6. An image encoding method comprising the steps of:
transforming, by a computer, a plurality of sample points of an image into a first error value of each sample point by obtaining, with respect to the plurality of sample points of the image, a difference between a pixel value of each sample point and a first prediction value of the each sample point;
transforming, by the computer, the plurality of sample points of the image into a second error value of each sample point by obtaining a difference between the first error value of each sample point and a second prediction value of the each sample point, the second prediction value being a linear approximation coefficient obtained based on an average value of the first error value of each sample point; and
generating, by the computer, an encoded image by encoding the average value of the first error value of each sample point and the second error value together.

7. A non-transitory computer readable medium storing an image encoding program for causing a computer to execute:
a function of generating an intra-prediction signal of an image;
a function of calculating a first residual signal from a difference between an original signal of the image and the intra-prediction signal;
a function of creating a residual approximation signal by linearly approximating the first residual signal based on a DC component of the first residual signal;
a function of calculating a second residual signal from a difference between the first residual signal and the residual approximation signal;
a function of generating a third residual signal by synthesizing the DC component of the first residual signal and the second residual signal; and
a function of performing variable-length encoding of the third residual signal.

8. An image decoding apparatus, comprising:
a variable-length decoding unit configured to perform variable-length decoding of an encoded stream of an image;
a transformation coefficient separation unit configured to separate a DC component and an AC component of a transformation coefficient subjected to the variable-length decoding;
a DC component inverse-transformation unit configured to calculate a decoded DC component by performing inverse-transformation of the DC component of the transformation coefficient;
a residual approximation signal creation unit configured to create a residual approximation signal based on the decoded DC component;
an inverse-transformation unit configured to calculate a decoded residual component by performing inverse-transformation of the AC component of the transformation coefficient; and
an adding unit configured to create a decoded signal by adding the residual approximation signal and the decoded residual component to an intra-prediction signal generated by performing intra-prediction processing of a reference image signal.

9. The image decoding apparatus according to claim 8, wherein
the residual approximation signal creation unit configured to create the residual approximation signal based on the decoded DC component and an intra-prediction mode in generating the intra-prediction signal.

10. The image decoding apparatus according to claim 8, wherein
the variable length decoding unit decodes a flag indicating effectiveness or ineffectiveness of a residual approximation,
when the flag indicates that the residual approximation is effective, the adding unit creates the decoded signal by adding the residual approximation signal and the decoded residual component to the intra-prediction signal, and when the flag indicates that the residual approximation is ineffective, the adding unit creates the decoded signal by adding the decoded residual component to the intra-prediction signal.

11. The image decoding apparatus according to claim 8, wherein
the variable-length decoding unit determines that a residual approximation is ineffective when the decoded DC component is zero, or the intra-prediction mode in encoding of the encoded stream that is a target of the variable-length decoding is a DC mode, and
the adding unit creates the decoded signal by adding the decoded residual component to the intra-prediction signal.

12. An image decoding method, comprising the steps of:
transforming, by a computer, an encoded image into an image by decoding, with respect to a plurality of sample points of an original image, a first prediction value of each sample point, and a difference value between a value of each sample point of the original image and a second prediction value;
separating, by the computer, the difference value into a DC component and an AC component;
generating, by the computer, a linear approximation coefficient based on the DC component of the difference value of each sample point as the second prediction value; and
creating, by the computer, a decoded image by adding the first prediction value, the second prediction value, and the AC component of the difference value.

13. A non-transitory computer readable medium storing an image decoding program for causing a computer to execute:
a function of performing variable-length decoding of an encoded stream of an image;
a function of separating a DC component and an AC component of a transformation coefficient subjected to the variable-length decoding;
a function of calculating a decoded DC component by performing inverse-transformation of the DC component of the transformation coefficient;
a function of creating a residual approximation signal based on the decoded DC component;
a function of calculating a decoded residual component by performing inverse-transformation of the AC component of the transformation coefficient; and
a function of creating a decoded signal by adding the residual approximation signal and the decoded residual component to the intra-prediction signal generated by performing intra-prediction processing of a reference image signal.

* * * * *